(12) United States Patent
Mochizuki

(10) Patent No.: US 8,899,360 B2
(45) Date of Patent: Dec. 2, 2014

(54) CABLE ARRANGEMENT STRUCTURE FOR VEHICLE

(75) Inventor: Yuichi Mochizuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 78 days.

(21) Appl. No.: 13/823,064

(22) PCT Filed: Sep. 29, 2011

(86) PCT No.: PCT/JP2011/005489
§ 371 (c)(1),
(2), (4) Date: Mar. 13, 2013

(87) PCT Pub. No.: WO2012/063399
PCT Pub. Date: May 18, 2012

(65) Prior Publication Data
US 2013/0213722 A1    Aug. 22, 2013

(30) Foreign Application Priority Data
Nov. 12, 2010   (JP) ................................ 2010-254116

(51) Int. Cl.
*B60K 1/00*     (2006.01)
*B60K 37/00*    (2006.01)
*B60L 11/18*    (2006.01)
*B60R 16/02*    (2006.01)

(52) U.S. Cl.
CPC .............. *B60L 11/18* (2013.01); *B60R 16/0215* (2013.01); *B60R 16/02* (2013.01)
USPC .......................................... 180/65.1; 296/208

(58) Field of Classification Search
USPC ......... 180/65.1, 65.21, 65.22, 291, 68.5, 311, 180/312, 232; 296/208; 439/34; 174/68.1, 174/68.3, 72 A, 74 R, 73.1
See application file for complete search history.

(56) References Cited

U.S. PATENT DOCUMENTS

| | | | | |
|---|---|---|---|---|
| 5,504,655 A | * | 4/1996 | Underwood et al. | ......... 439/911 |
| 5,915,494 A | | 6/1999 | Matsumura et al. | |
| 6,460,642 B1 | * | 10/2002 | Hirano | ......... 180/65.1 |

(Continued)

FOREIGN PATENT DOCUMENTS

| | | |
|---|---|---|
| JP | 8-164760 A | 6/1996 |
| JP | 2004-148850 A | 5/2004 |
| JP | 2006-44537 A | 2/2006 |
| JP | 2009-298214 A | 12/2009 |

*Primary Examiner* — J. Allen Shriver, II
*Assistant Examiner* — James M Dolak
(74) *Attorney, Agent, or Firm* — Westerman, Hattori, Daniels & Adrian, LLP

(57) ABSTRACT

A cable arrangement structure for a vehicle according to the present invention, the vehicle including a cabin section and a driving unit disposing section where a motor is arranged, comprises a cable which is arranged to extend from said cabin section to said driving unit disposing section to transmit power between the motor and a battery. The vehicle comprises a frame member which extends in a vehicle width direction and a vehicle constituting component which includes, in the driving unit disposing section, an extending portion arranged to face the frame member and extending in the vehicle width direction, and a protruding portion protruding from the extending portion toward the frame member. The cable extends in a back-and-forth direction of the vehicle and includes a first curved portion and a second curved portion with an inflection point therebetween. The cable includes an intermediate portion between the first curved portion and the second curved portion. The intermediate portion includes the inflection point and passes between the frame member and the extending portion beside the protruding portion.

6 Claims, 8 Drawing Sheets

(56) References Cited

U.S. PATENT DOCUMENTS

| | | |
|---|---|---|
| 7,497,284 B2 * | 3/2009 | Yamaguchi et al. .......... 180/65.1 |
| 7,561,445 B2 * | 7/2009 | Yajima et al. .................... 439/34 |
| 7,766,113 B2 * | 8/2010 | Yamafuji ..................... 180/68.5 |
| 7,770,525 B2 * | 8/2010 | Kumar et al. ................... 105/51 |
| 8,205,700 B2 * | 6/2012 | Nagata et al. ................. 180/68.5 |
| 8,444,216 B2 * | 5/2013 | Yamaguchi et al. ........... 296/208 |
| 8,561,296 B2 * | 10/2013 | Oga et al. ..................... 174/72 A |
| 8,624,114 B2 * | 1/2014 | Oga et al. ..................... 174/72 R |
| 8,657,355 B2 * | 2/2014 | Kato ............................ 296/37.1 |

* cited by examiner

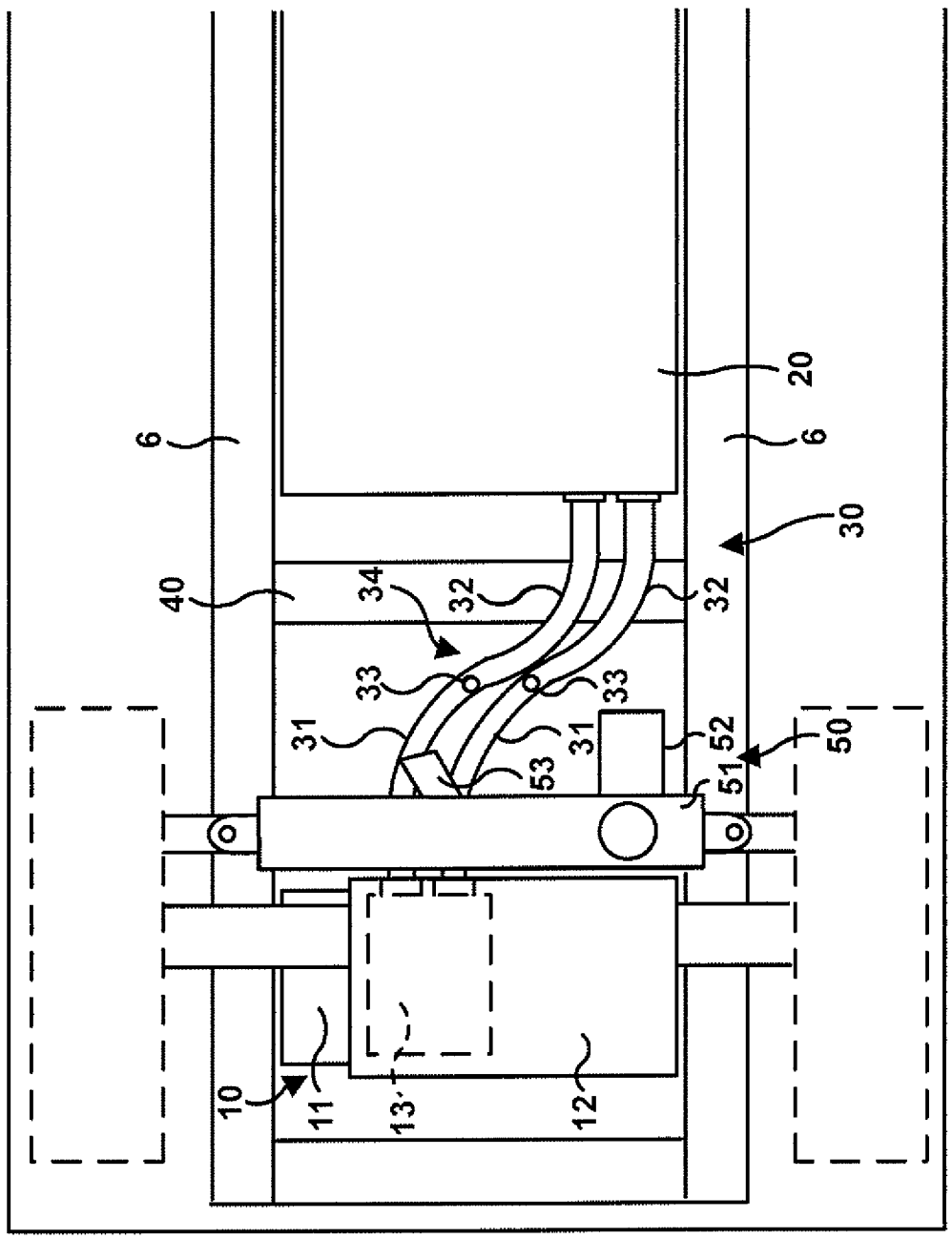

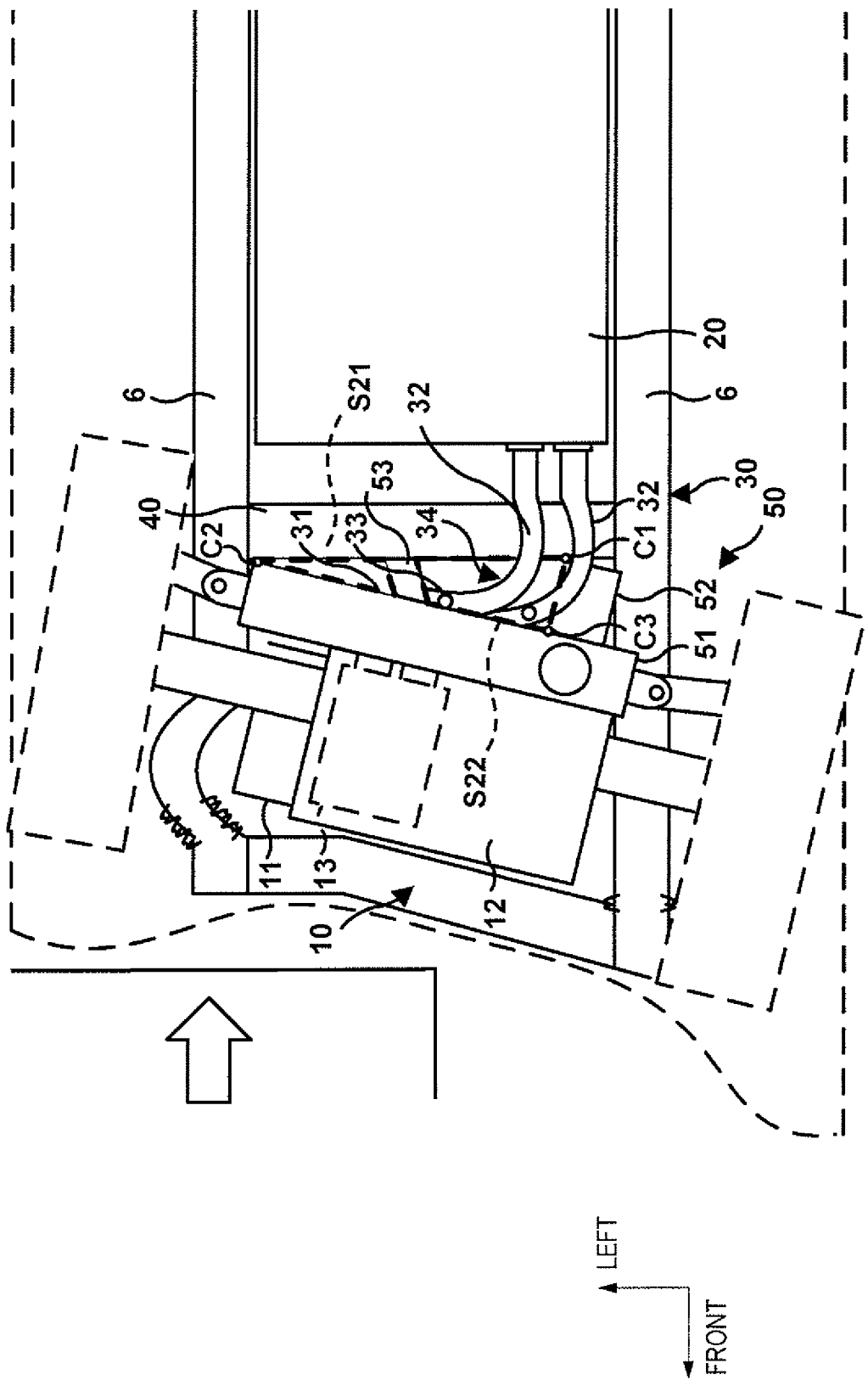

CABLE ARRANGEMENT STRUCTURE FOR VEHICLE

CROSS-REFERENCED TO RELATED APPLICATIONS

This application is a National Stage entry of International Application PCT/JP2011/005489 filed Sep. 29, 2011, which claims priority of Japanese Patent Application No. 2010-254116, filed Nov. 12, 2010, the disclosure of these prior applications are hereby incorporated in their entirety by reference.

TECHNICAL FIELD

The present invention relates to a cable arrangement structure for power transmission between a motor and a battery in a vehicle.

BACKGROUND ART

An electric vehicle or hybrid vehicle needs a high-capacity battery, thereby requiring a larger arrangement space. A battery, therefore, is disposed in a cabin section or trunk room instead of a driving unit disposing section where a motor and engine are arranged (for example, PTL1).

CITATION LIST

Patent Literature

PTL1: Japanese Patent Laid Open No. 2004-148850

SUMMARY OF INVENTION

Technical Problem

If the battery is disposed in the cabin section or trunk room, a cable for power transmission between the motor and the battery is arranged across the driving unit disposing section and the cabin section. Therefore, the cable length tends to be long, and the arrangement space is restricted. Depending on the behavior of the cable in a vehicle collision, the cable itself may get damaged due to interference with peripheral components.

The present invention has as its object to more reliably prevent damage to the cable in a vehicle collision.

Solution to Problem

According to the present invention, there is provided a cable arrangement structure for a vehicle, said vehicle including a cabin section and a driving unit disposing section where a motor is arranged, said cable arrangement structure comprising a cable which is arranged to extend from said cabin section to said driving unit disposing section to transmit power between said motor and a battery, wherein said vehicle comprises a frame member which extends in a vehicle width direction at a position between said cabin section and said driving unit disposing section, and a vehicle constituting component which includes, in said driving unit disposing section, an extending portion arranged to face said frame member and extending in the vehicle width direction, and a protruding portion protruding from said extending portion toward said frame member, said cable extends in a back-and-forth direction of the vehicle and includes a first curved portion and a second curved portion with an inflection point therebetween, said cable includes an intermediate portion between said first curved portion and said second curved portion, and said intermediate portion includes the inflection point and passes between said frame member and said extending portion beside said protruding portion.

In this arrangement structure, since the cable includes the first curved portion, the second curved portion and the inflection point, the cable deforms in a regular pattern when the impact load acts in the back-and-forth direction of the vehicle, thereby avoiding interference with peripheral components due to unexpected deformation. Since the intermediate portion, of the cable, includes the inflection point between the first curved portion and the second curved portion and passes between the frame member and the extending portion beside the protruding portion, it is possible to prevent the intermediate portion from being sandwiched. It is, therefore, possible to more reliably prevent damage to the cable in a vehicle collision.

In a preferred embodiment of the present invention, when the vehicle constituting component is translated in the back-and-forth direction of the vehicle to a virtual position where the protruding portion abuts against the frame member, the intermediate portion may pass through a space between the frame member and the extending portion beside the protruding portion.

According to this arrangement, even if a larger impact load is imposed, it is possible to prevent the intermediate portion from being sandwiched, thereby more reliably preventing damage to the cable.

In the preferred embodiment of the present invention, if the vehicle constituting component pivots, from the virtual position, about the butt portion between the protruding portion and the frame member to a virtual pivot position where part of the extending portion abuts against the frame member, the intermediate portion may pass through a virtual triangle having, as vertices, the butt portion, the part of the extending portion, and the root portion of the protruding portion.

According to this arrangement, even if a larger impact load is imposed, it is possible to prevent the intermediate portion from getting caught between other members, thereby more reliably preventing damage to the cable.

In the preferred embodiment of the present invention, the vehicle constituting component may include an auxiliary protruding portion which is arranged between the protruding portion and the part of the extending portion to protrude toward the frame member and divide the virtual triangle.

According to this arrangement, even if a larger impact load is imposed, it is possible to more reliably secure a space around the intermediate portion, thereby preventing it from being sandwiched.

Furthermore, in the preferred embodiment of the present invention, the driving unit disposing section may be disposed in front of the cabin section, and the vehicle constituting component may be a steering gear box. Using the essential arrangement of the vehicle can eliminate the need for an additional special member.

In the preferred embodiment of the present invention, the cable may be bent in an S-shape to form the first curved portion, second curved portion, and inflection point.

Advantageous Effects of Invention

According to the present invention, it is possible to more reliably prevent damage to a cable in a vehicle collision.

BRIEF DESCRIPTION OF DRAWINGS

FIG. 4A is a view showing a cable arrangement structure for a vehicle according to another embodiment of the present invention;

FIG. 4B is a view showing an example of the arrangement of components after a vehicle collision;

DESCRIPTION OF EMBODIMENTS

<First Embodiment>

Figure 1A:
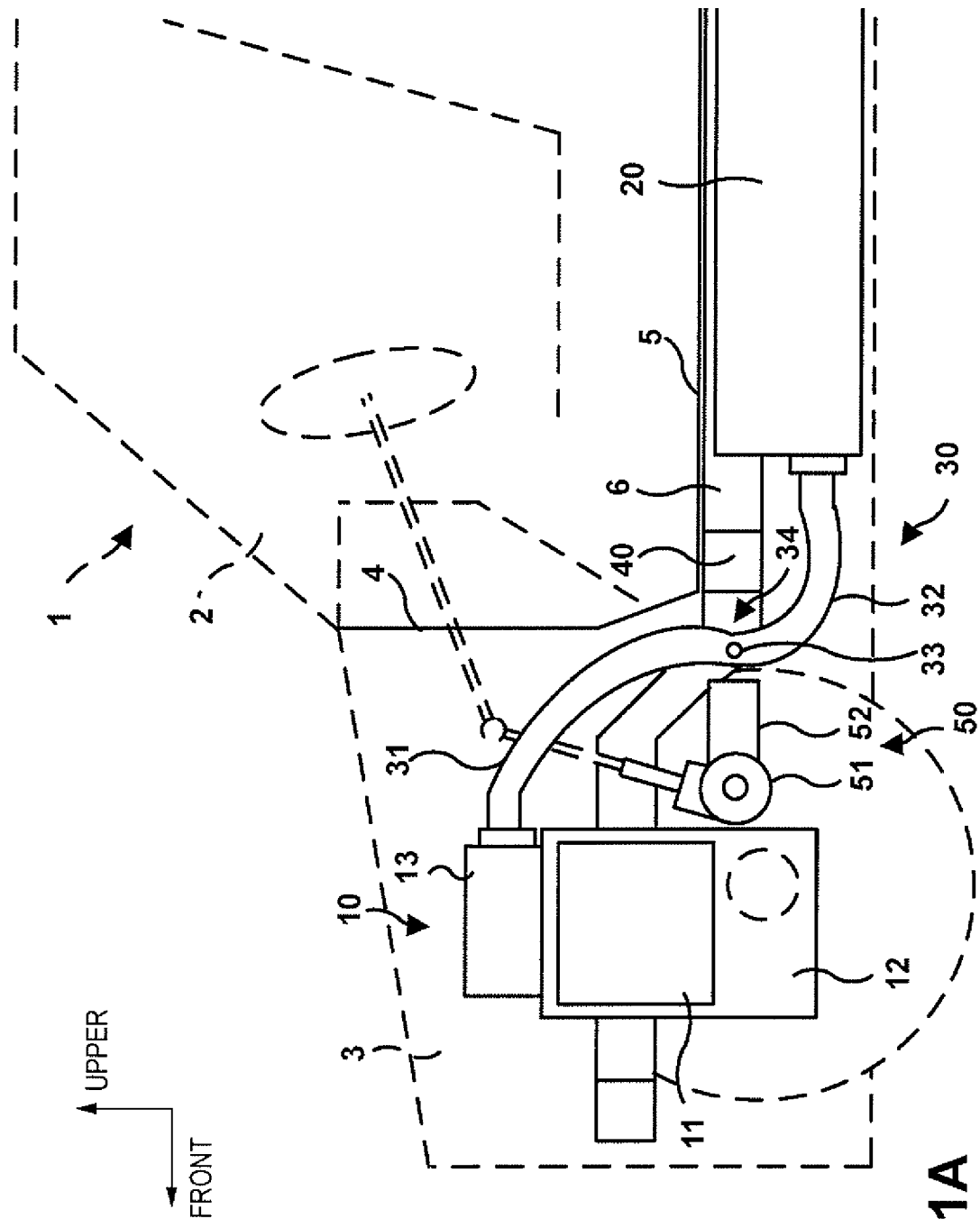
FIG. 1A is a view showing a cable arrangement structure for a vehicle according to the first embodiment of the present invention when viewed from the left side of the vehicle.
Figure 1B:
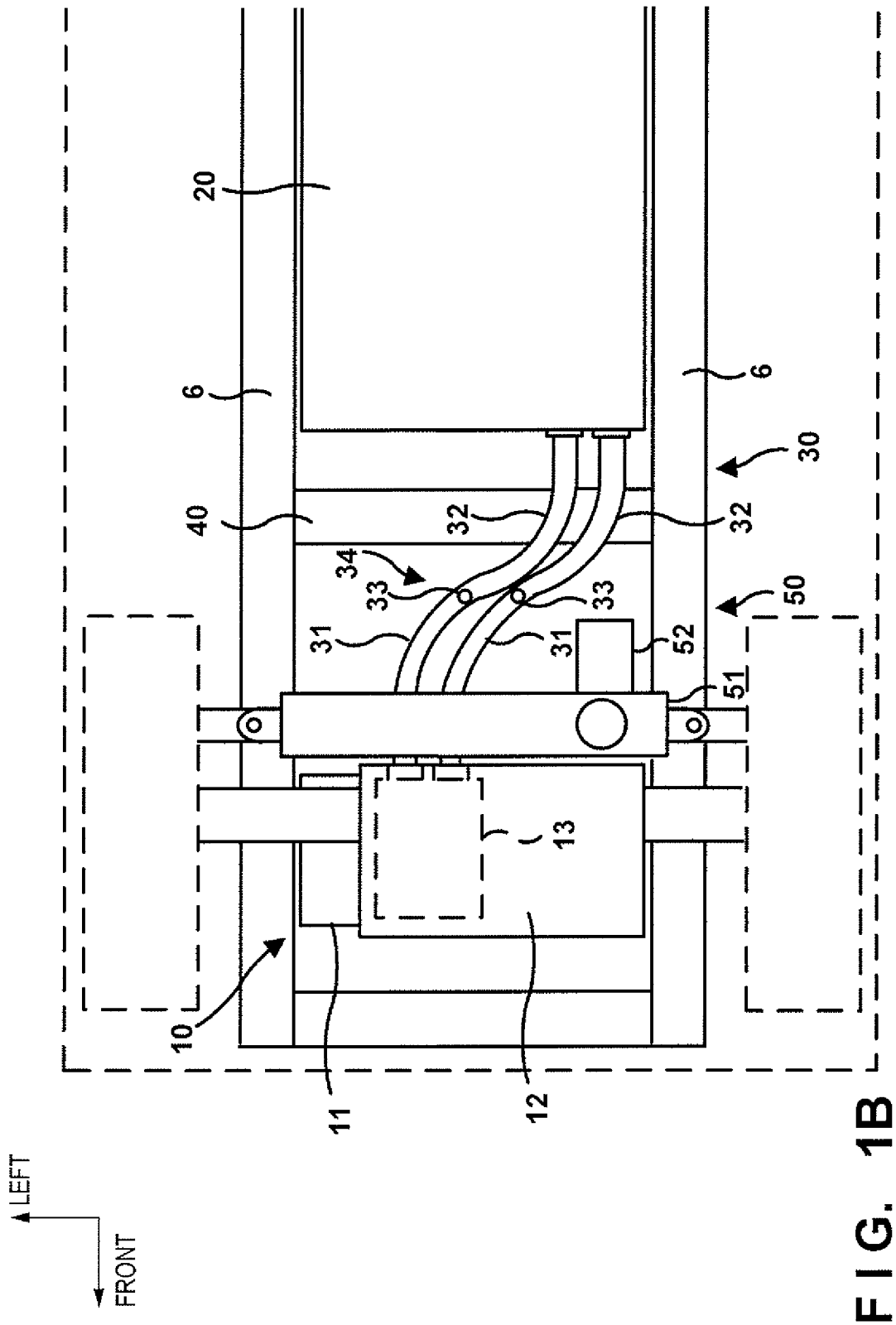
FIG. 1B is a view showing the cable arrangement structure for the vehicle according to the first embodiment of the present invention when viewed from the bottom of the vehicle.

FIGS. 1A and 1B are views each showing a cable arrangement structure for a vehicle according to the first embodiment of the present invention. FIG. 1A is a view when viewed from the left side of the vehicle. FIG. 1B is a view when viewed from the bottom of the vehicle.

A vehicle 1 includes a cabin section 2 with a compartment space where seats, a luggage space, and the like are disposed, and a driving unit disposing section 3 with a space, partitioned by a dash panel 4, where a driving unit 10 is disposed. The driving unit disposing section 3 is disposed in front of the cabin section 2, and a trunk section (not shown) is disposed behind the cabin section 2. The trunk section has a trunk space. The vehicle 1 is an FF drive electric vehicle in which the driving force of the driving unit 10 is transmitted to the front wheels.

The driving unit 10 includes a motor 11, a power transmission device 12, and an inverter 13. The power transmission device 12 includes, for example, an automatic transmission and differential gear, and transmits the driving force generated by the motor 11 to the front wheels. In this embodiment, the motor 11 is disposed on the left side of the power transmission device 12, and the inverter 13 is disposed above the power transmission device 12.

Below the cabin section 2, a battery 20 is disposed under a floor panel 5. The battery 20 is disposed between left and right side frames 6, and supported by these side frames 6 and a frame member 40 (to be described later). A cover for covering the battery 20 is disposed under the battery 20. The battery 20 may be disposed in the trunk room (not shown).

The frame member 40 extending in the vehicle width direction is disposed at a position where the cabin section 2 and the driving unit disposing section 3 are partitioned. The frame member 40 reinforces the vehicle. In this embodiment, the frame member 40 is connected to the left and right side frames 6 to bridge them.

A steering mechanism 50 for steering the front wheels is disposed in the driving unit disposing section 3. The steering mechanism 50 includes a steering gear box 51 for accommodating a tie rod. In this embodiment, the steering gear box 51 includes a motor 52, thereby forming an electric power steering system.

The steering gear box 51 is a vehicle constituting component in which the main body forms an extending portion that is arranged to face the frame member 40 and extends in the vehicle width direction, and the motor 52 forms a protruding portion protruding toward the frame member 40.

A cable 30 indicates a pair of cables which connect the battery 20 with the inverter 13 to transmit power between the battery 20 and the motor 11. The cable 30 is arranged to extend from the cabin section 2 to the driving unit disposing section 3.

The cable 30 extends in the back-and-forth direction and the vertical direction of the vehicle, and includes curved portions 31 and 32 with an inflection point 33 therebetween. In this embodiment, the curved portions 31 and 32 bend in the opposite directions, and thus the cable 30 as a whole bends in an S-shape. The cable 30 is connected with the inverter 13 at a position, in the vertical direction, higher than that of the steering gear box 51. The cable 30 is connected with the battery 20 at a position, in the vertical direction, lower than that of the steering gear box 51.

Figure 5A:
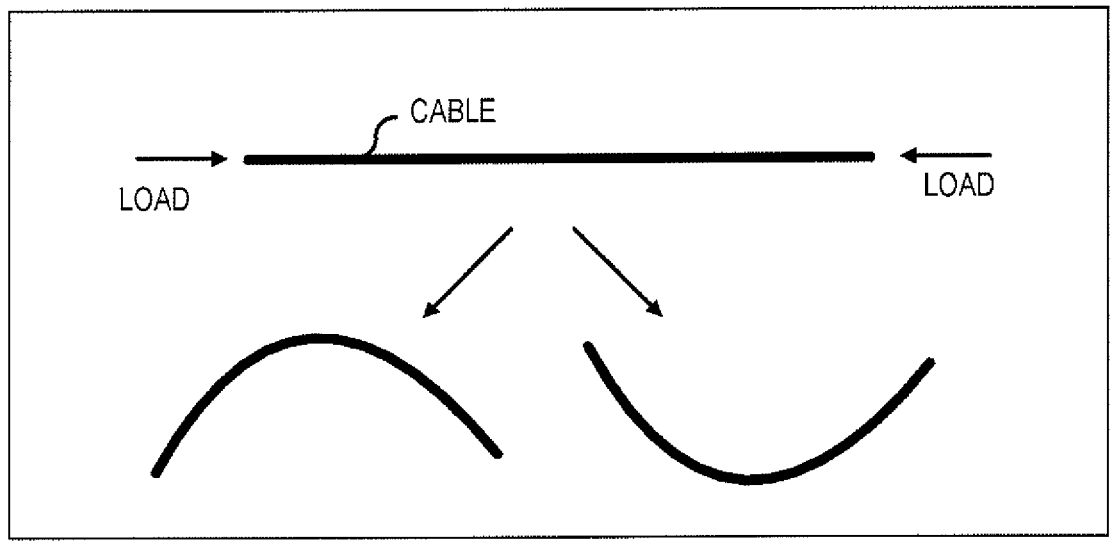
FIG. 5A is a view for explaining the deformation of a cable according to its shape.

The deformation of the cable 30 due to a load will be described with reference to FIGS. 5A and 5B. FIG. 5A shows a comparative example in which the cable is linearly arranged. If the cable is linearly arranged and a load acts in the back-and-forth direction of the vehicle, the cable deforms irregularly in a plurality of patterns, as shown in FIG. 5A. Unexpected deformation may cause interference with peripheral components, and thus the cable may get damaged.

Figure 5B:
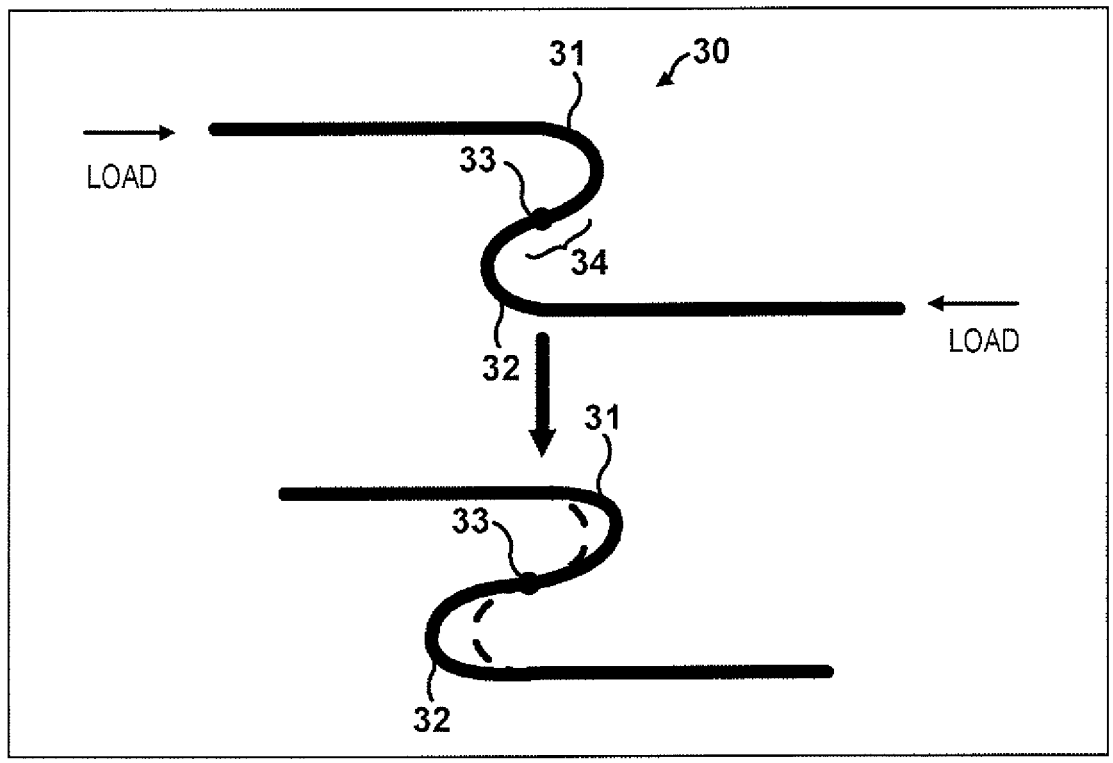
FIG. 5B is a view for explaining the deformation of a cable according to its shape.

On the other hand, in this embodiment, as shown in FIG. 5B, the cable 30 includes the curved portions 31 and 32 with the inflection point 33 therebetween. If, therefore, a load acts on the cable 30 in the back-and-forth direction, the cable 30 deforms in a regular pattern, as shown in FIG. 5B. Especially, the inflection point 33 is hardly displaced. This enables to arrange the cable 30 so as to avoid interference with the peripheral components in a collision in the back-and-forth direction, as will be described below.

Referring back to FIGS. 1A and 1B, the curved portions 31 and 32 are arranged in a space where they can deform. An intermediate portion 34, of the cable 30, including the inflection point 33 between the curved portions 31 and 32 passes between the frame member 40 and the steering gear box 51 beside the motor 52. Since the intermediate portion 34 is positioned between the steering gear box 51 and the frame member 40, it may get caught between them in a collision in the back-and-forth direction. Since the intermediate portion 34, however, passes beside the motor 52, the motor 52 prevents the intermediate portion 34 from getting caught between these members, as will be described below.

Figure 2A:
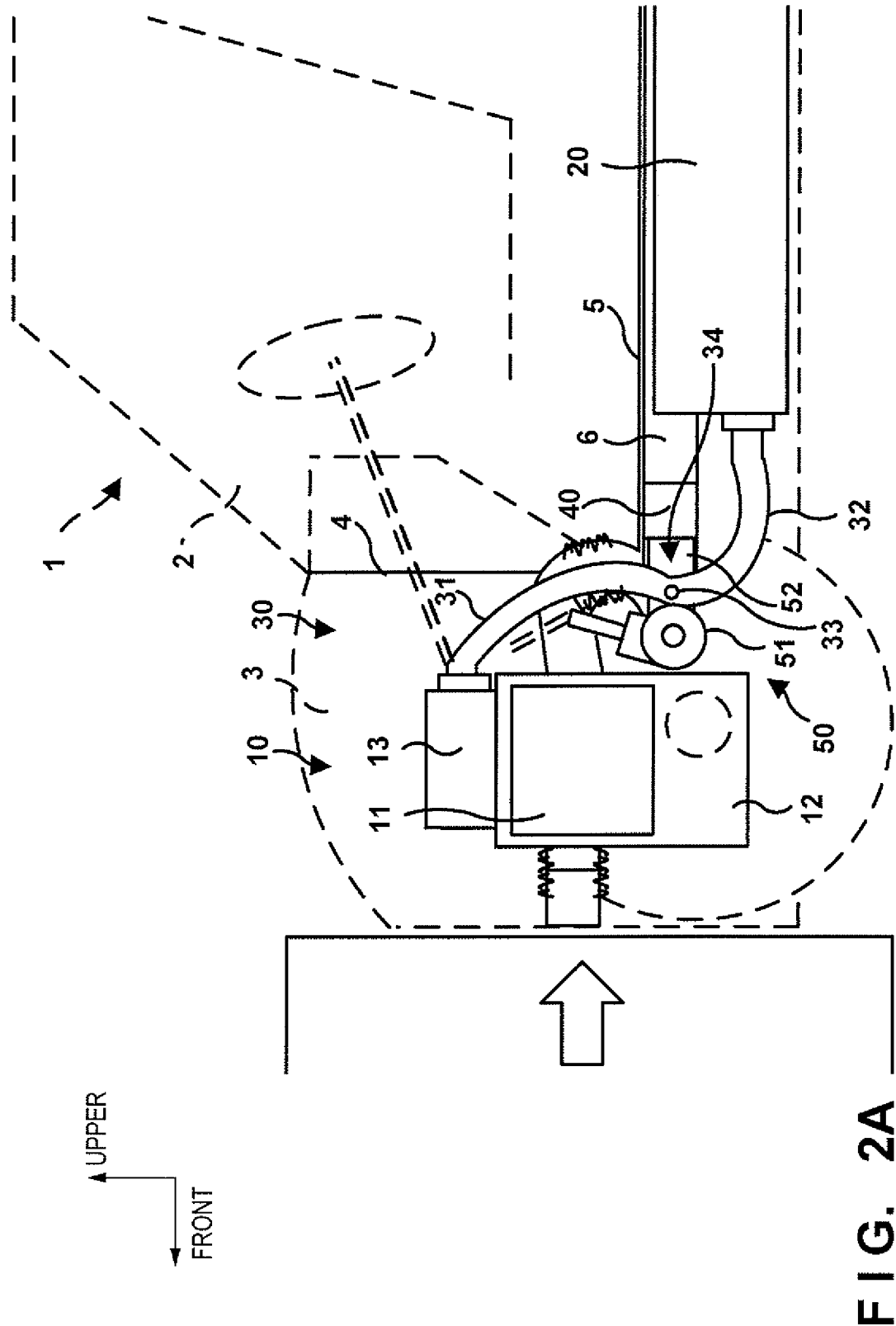
FIG. 2A is a view showing an example of the arrangement of components after a vehicle collision when viewed from the left side of the vehicle.
Figure 2B:
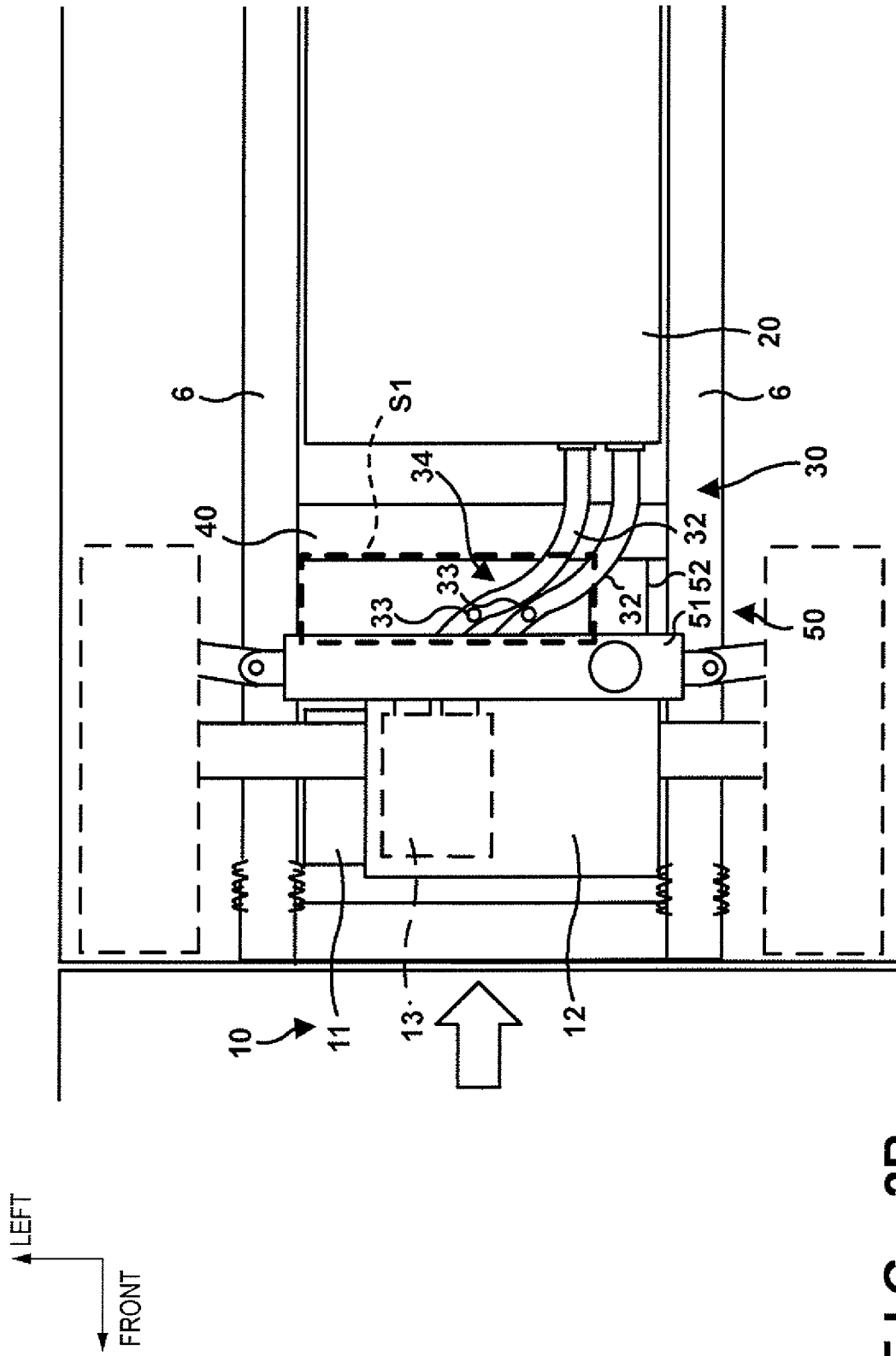
FIG. 2B is a view showing the example of the arrangement of the components after the vehicle collision when viewed from the bottom of the vehicle.

FIGS. 2A and 2B are views each showing an example of the arrangement of the components after a vehicle collision. FIG. 2A is a view when seen from the left side of the vehicle. FIG. 2B is a view when seen from the bottom of the vehicle.

The steering gear box 51 is displaced towards the frame member 40 by the impact of the vehicle collision in the back-and-forth direction. FIGS. 2A and 2B are the views assuming that the steering gear box 51 is translated in the back-and-forth direction of the vehicle. Since the motor 52 protrudes from the steering gear box 51 toward the frame member 40, it abuts against the frame member 40.

By arranging, in advance, the intermediate portion 34 to pass through a space S1 surrounded by the main body of the steering gear box 51, the motor 52, and the frame member 40, it is possible to avoid the intermediate portion 34 from being sandwiched between the steering gear box 51 and frame member 40.

If the intermediate portion 34 is displaced at this time, it may be positioned between the motor 52 and the frame member 40, and may thus get caught between them. As described with reference to FIG. 5B, however, the inflection point 33 is hardly displaced, and the displacement amount of the intermediate portion 34 around the inflection point 33 is also small. Therefore, the intermediate portion 34 does not get caught between the motor 52 and the frame member 40.

Note that since the displacement amount of the inflection point 33 is smallest, the inflection point 33 preferably passes through between the frame member 40 and the steering gear box 51, especially, the space S1, beside the motor 52, as shown in FIGS. 2A and 2B.

Figure 3:
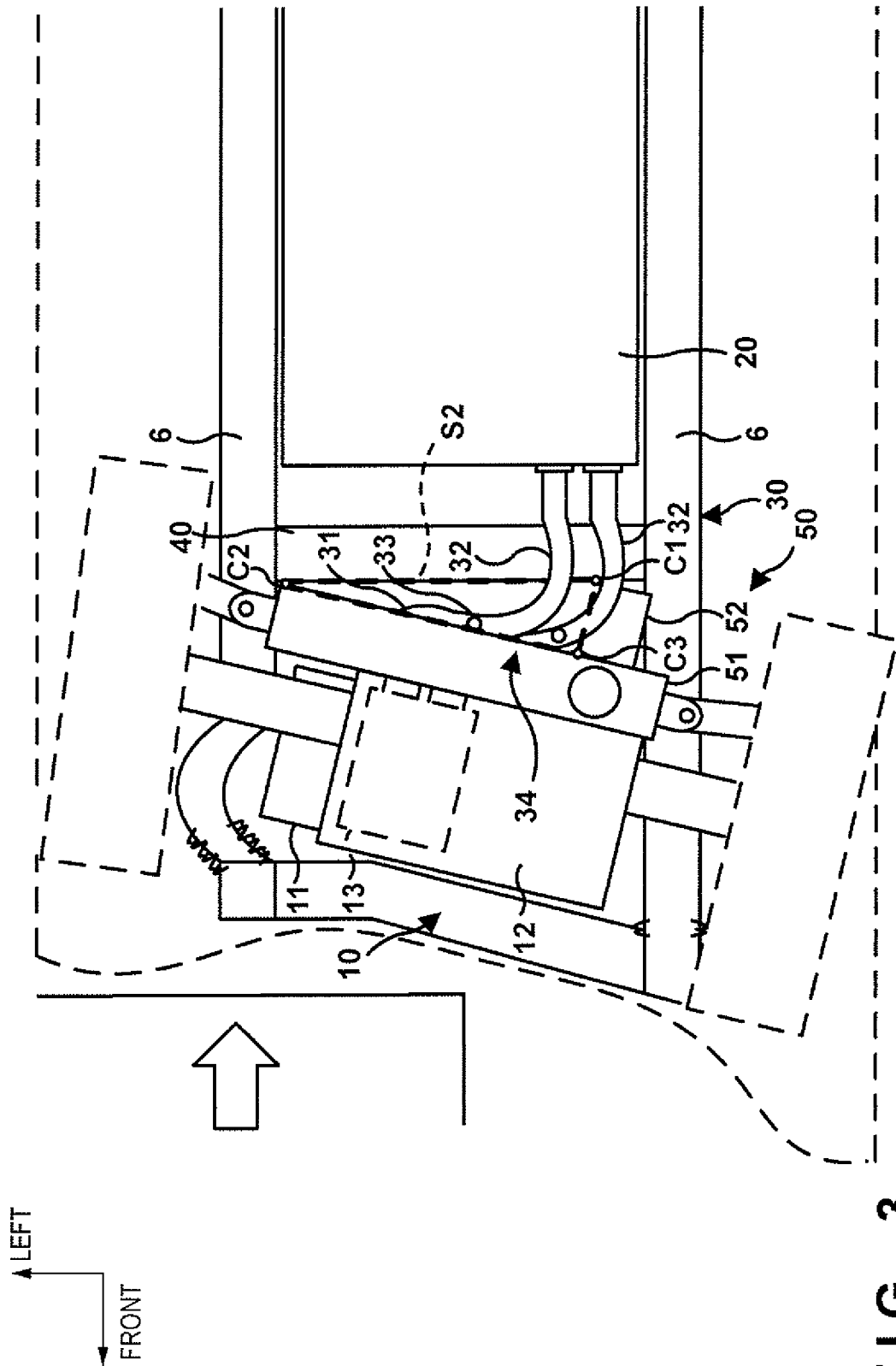
FIG. 3 is a view showing another example of the arrangement of the components after a vehicle collision.

If the impact of the collision in the back-and-forth direction is great, it is expected that the steering gear box 51 also pivots in the state shown in FIGS. 2A and 2B. FIG. 3 is a view showing another example of the arrangement of the components after the vehicle collision when viewed from the bottom of the vehicle. FIG. 3 shows a case in which the steering gear box 51 has pivoted.

FIG. 3 shows a case in which the steering gear box 51 pivots about a butt portion C1 between the motor 52 and the frame member 40 from a virtual position shown in FIGS. 2A and 2B, and an end portion C2 of the main body of the steering gear box 51 abuts against the frame member 40.

At this virtual pivot position, a virtual triangular space S2 having, as its vertices, the butt portion C1, the end portion C2 of the steering gear box 51, and a root portion C3 of the electric power steering motor 52 is formed. By arranging, in advance, the intermediate portion 34 to pass through the space S2, it is possible to avoid the intermediate portion 34 from getting caught between the steering gear box 51 and the frame member 40. As described above with reference to FIG. 2, the displacement amount of the inflection point 33 is smallest, and therefore, the inflection point 33 preferably passes through the space S2.

Note that whether the steering gear box 51 is positioned at the virtual position shown in FIGS. 2A and 2B or the virtual pivot position shown in FIG. 3 in a vehicle collision depends on the direction of the impact, the shape of the peripheral components, and the like in addition to the magnitude of the impact. As an example in which the steering gear box 51 is positioned at the virtual pivot position, FIG. 3 assumes a case in which the vehicle has collided at its front surface at a position offset to one side (the right side of the vehicle in FIG. 3) on which the motor 52 is not arranged.

As described above, according to this embodiment, it is possible to more reliably prevent damage to the cable 30 in a vehicle collision. In this embodiment, the steering gear box 51 is used as a vehicle constituting component facing the frame member 40 to form a space where the intermediate portion 34 passes. Another component or an additional member for forming the passing space may be disposed. Using the essential arrangement of the vehicle can eliminate the need for an additional special member.

<Second Embodiment>

A steering gear box 51 is a high-rigid component. If the impact load is excessively large in a collision in the back-and-forth direction, and the steering gear box 51 flexes at the virtual pivot position shown in FIG. 3, a space S2 may collapse.

To deal with this problem, as shown in FIGS. 4A and 4B, it is possible to increase the number of butt points. FIG. 4A is a view showing a cable arrangement structure for a vehicle according to the embodiment of the present invention. FIG. 4B is a view showing an example of the arrangement of components after a vehicle collision.

In the example of FIGS. 4A and 4B, the steering gear box 51 further includes an auxiliary protruding portion 53 which is arranged between a motor 52 and an end portion C2 of the main body of the steering gear box 51 to protrude toward a frame member 40 and divide a virtual triangle (the space S2) into two spaces S21 and S22. The auxiliary protruding portion 53 is disposed especially for the purpose of increasing the number of butt points. As in a case in which the motor 52 is used as a protruding portion, it is preferable to use the essential arrangement of the steering gear box 51.

The auxiliary protruding portion 53 is formed so that its end portion is positioned on a straight line connecting the end portion C2 of the steering gear box 51 and a butt portion C1 between the electric power steering motor 52 and the frame member 40.

Disposing the auxiliary protruding portion 53 increases the number of butt points between the steering gear box 51 and the frame member 40, thereby reducing the deformation of the steering gear box 51. Even if, therefore, a large impact load is imposed, it is possible to more reliably secure a space around an intermediate portion 34, thereby preventing it from getting caught between other members.

Note that in FIG. 4B, a pair of cables 30 passes through the wider space S22. The pair of cables 30 may pass through the space 21, or one cable may pass through one space and the other cable may pass through the other space.

<Other Embodiments>

In the above-described embodiments, the vehicle 1 is an FF drive vehicle. The present invention is also applicable to an RR drive vehicle in which a driving unit disposing section 3 is disposed behind a cabin section 2 to transmit the driving force of a driving unit 10 to the rear wheels, or a mid-ship vehicle.

In the above-described embodiments, the vehicle 1 is an electric vehicle which uses only the motor 11 as a driving source. A vehicle 1, however, may be a hybrid vehicle which uses both an engine and motor.

Although the battery 20 is disposed below the cabin section 2 in the above-described embodiments, it may be disposed within a cabin space. For example, the battery 20 may be disposed below seats within the cabin space.

Although a vehicle with a frame structure having the side frames 6 is considered in the above-described embodiment, it may have a monocoque structure.

The present invention is not limited to the above-described embodiments, and various changes and modifications can be made within the spirit and scope of the present invention. Therefore, to apprise the public of the scope of the present invention, the following claims are made.

This application claims the benefit of Japanese Patent Application No. 2010-254116, filed Nov. 12, 2010, which is hereby incorporated by reference herein in its entirety.

The invention claimed is:

1. A cable arrangement structure for a vehicle, said vehicle including a cabin section and a driving unit disposing section where a motor is arranged, said cable arrangement structure comprising a cable which is arranged to extend from said cabin section to said driving unit disposing section to transmit power between said motor and a battery, wherein said vehicle comprises a frame member which extends in a vehicle width direction at a position between said cabin section and said driving unit disposing section, and a vehicle constituting component which includes, in said driving unit disposing section, an extending portion arranged to face said frame member and extending in the vehicle width direction, and a protruding portion protruding from said extending portion toward said frame member, said cable extends in a back-and-forth direction of the vehicle and includes a first curved portion and a second curved portion with an inflection point therebetween, said cable includes an intermediate portion between said first curved portion and said second curved portion, and said intermediate portion includes the inflection point and passes between said frame member and said extending portion beside said protruding portion.

2. The cable arrangement structure for a vehicle according to claim 1, wherein when said vehicle constituting component is translated in the back-and-forth direction of the vehicle to a virtual position where said protruding portion abuts against said frame member, said intermediate portion passes through a space between said frame member and said extending portion beside said protruding portion.

3. The cable arrangement structure for a vehicle according claim 2, wherein when said vehicle constituting component pivots, from the virtual position, about a butt portion between said protruding portion and said frame member to a virtual pivot position where part of said extending portion abuts against said frame member, said intermediate portion passes through a virtual triangle having, as vertices, the butt portion, the part of said extending portion, and a root portion of said protruding portion.

4. The cable arrangement structure for a vehicle according claim 3, wherein said vehicle constituting component includes an auxiliary protruding portion which is arranged between said protruding portion and the part of said extending portion to protrude toward said frame member and divide the virtual triangle.

5. The cable arrangement structure for a vehicle according claim 1, wherein said driving unit disposing section is disposed in front of said cabin section, and said vehicle constituting component is a steering gear box.

6. The cable arrangement structure for a vehicle according claim 1, wherein said cable is bent in an S-shape to form said first curved portion, said second curved portion, and the inflection point.

* * * * *